(12) United States Patent
Kim et al.

(10) Patent No.: US 11,868,582 B2
(45) Date of Patent: Jan. 9, 2024

(54) APPARATUS FOR CONTROLLING DEVICE BASED ON AUGMENTED REALITY AND METHOD THEREOF

(71) Applicant: LG ELECTRONICS INC., Seoul (KR)

(72) Inventors: Beom Oh Kim, Suwon-si (KR); Tae Hyun Kim, Seoul (KR); Won Ho Shin, Seoul (KR); Ji Chan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 444 days.

(21) Appl. No.: 16/790,649

(22) Filed: Feb. 13, 2020

(65) Prior Publication Data

US 2021/0072877 A1 Mar. 11, 2021

(30) Foreign Application Priority Data

Sep. 6, 2019 (KR) .......................... 10-2019-0110662

(51) Int. Cl.
*G06F 3/04815* (2022.01)
*G06F 3/01* (2006.01)
*G06T 19/00* (2011.01)
*H04L 67/08* (2022.01)
(Continued)

(52) U.S. Cl.
CPC .......... *G06F 3/04815* (2013.01); *G06F 3/011* (2013.01); *G06T 11/00* (2013.01);
(Continued)

(58) Field of Classification Search
CPC ...... G06F 3/011; G06F 3/04815; G06T 11/00; G06T 19/006; G08C 17/00; G08C 17/02;
(Continued)

(56) References Cited

U.S. PATENT DOCUMENTS 11,061,536 B2 * 7/2021 Walkin .................. G06F 3/0486
2011/0124410 A1 * 5/2011 Mao ....................... A63F 13/211
463/31

(Continued)

FOREIGN PATENT DOCUMENTS

KR 1020120046605 5/2012
KR 101989828 6/2019

*Primary Examiner* — Omer S Khan
(74) *Attorney, Agent, or Firm* — LEE, HONG, DEGERMAN, KANG & WAIMEY

(57) ABSTRACT

An augmented reality-based device control method and a control apparatus thereof are disclosed. The augmented reality-based device control method includes obtaining a real image with a device to be controlled as a subject, as an image which configures an augmented reality (AR)-based remote controller and detecting a remote control (RC) protocol of the device to be controlled by recognizing the real image. The detecting of an RC protocol of the device to be controlled includes verifying whether the device to be controlled is controllable through a candidate RC protocol based on whether the device to be controlled operates according to the real image. According to the present disclosure, the device can be controlled based on the augmented reality using artificial intelligence (AI)-based image recognition through a 5G network.

11 Claims, 10 Drawing Sheets

(51) Int. Cl.
  *H04L 12/28*    (2006.01)
  *G08C 17/00*    (2006.01)
  *G06T 11/00*    (2006.01)
(52) U.S. Cl.
  CPC ............ *G06T 19/006* (2013.01); *G08C 17/00* (2013.01); *H04L 12/281* (2013.01); *H04L 67/08* (2013.01); *G08C 2201/93* (2013.01)
(58) Field of Classification Search
  CPC ............ G08C 2201/30; G08C 2201/93; H04L 12/281; H04L 67/08
  See application file for complete search history.

(56) References Cited

U.S. PATENT DOCUMENTS

| | | | |
|---|---|---|---|
| 2011/0138416 A1* | 6/2011 | Kang | H04N 21/4821 725/39 |
| 2013/0019182 A1* | 1/2013 | Gil | G06F 3/0482 715/834 |
| 2013/0187861 A1* | 7/2013 | Lavallee | G06F 3/0486 345/173 |
| 2013/0207963 A1* | 8/2013 | Stirbu | G06T 19/00 345/419 |
| 2014/0167931 A1* | 6/2014 | Lee | G08C 17/02 340/12.5 |
| 2015/0084840 A1* | 3/2015 | Kim | G02B 27/017 345/8 |
| 2016/0125733 A1* | 5/2016 | Sallas | G08C 17/02 398/106 |
| 2019/0171170 A1* | 6/2019 | Becea | H04L 67/025 |

\* cited by examiner

[FIG. 1]
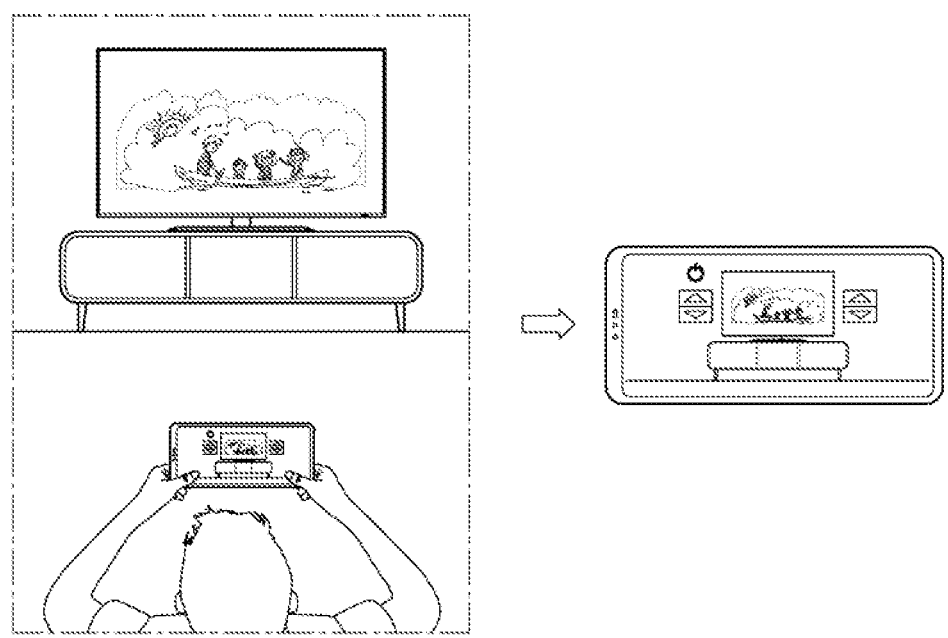

[FIG. 2]
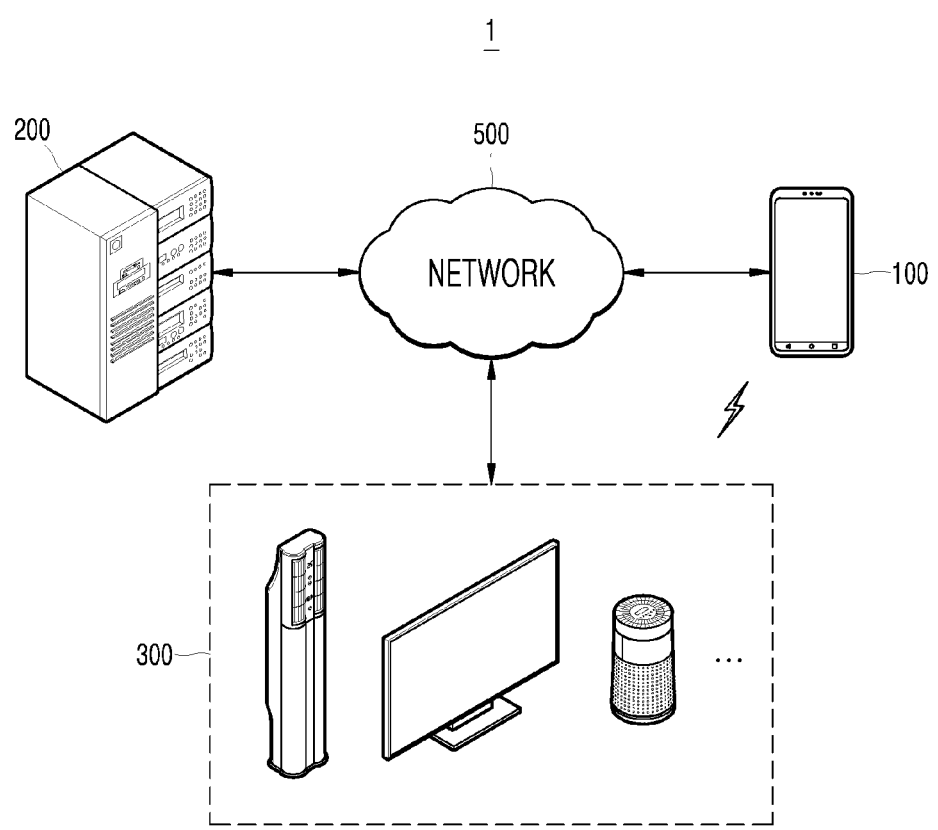

[FIG. 3]
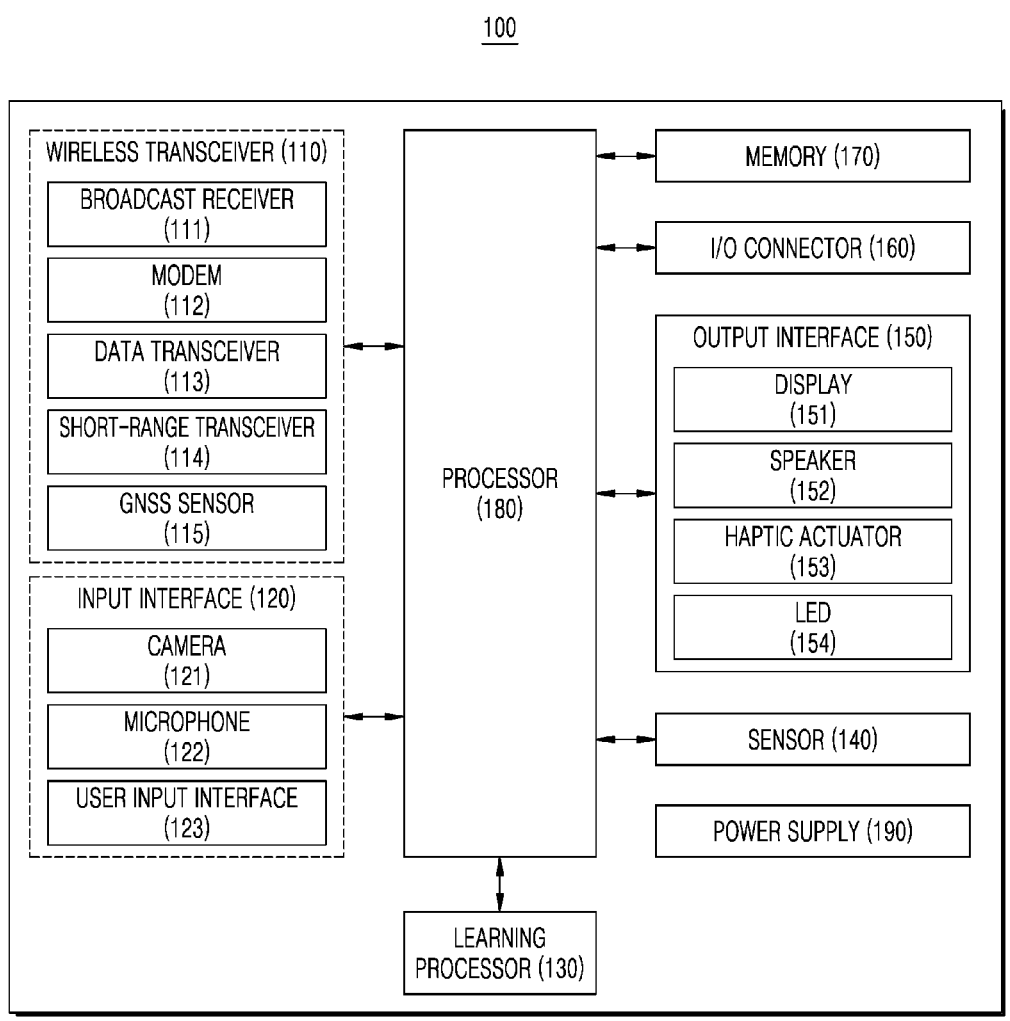

[FIG. 4]
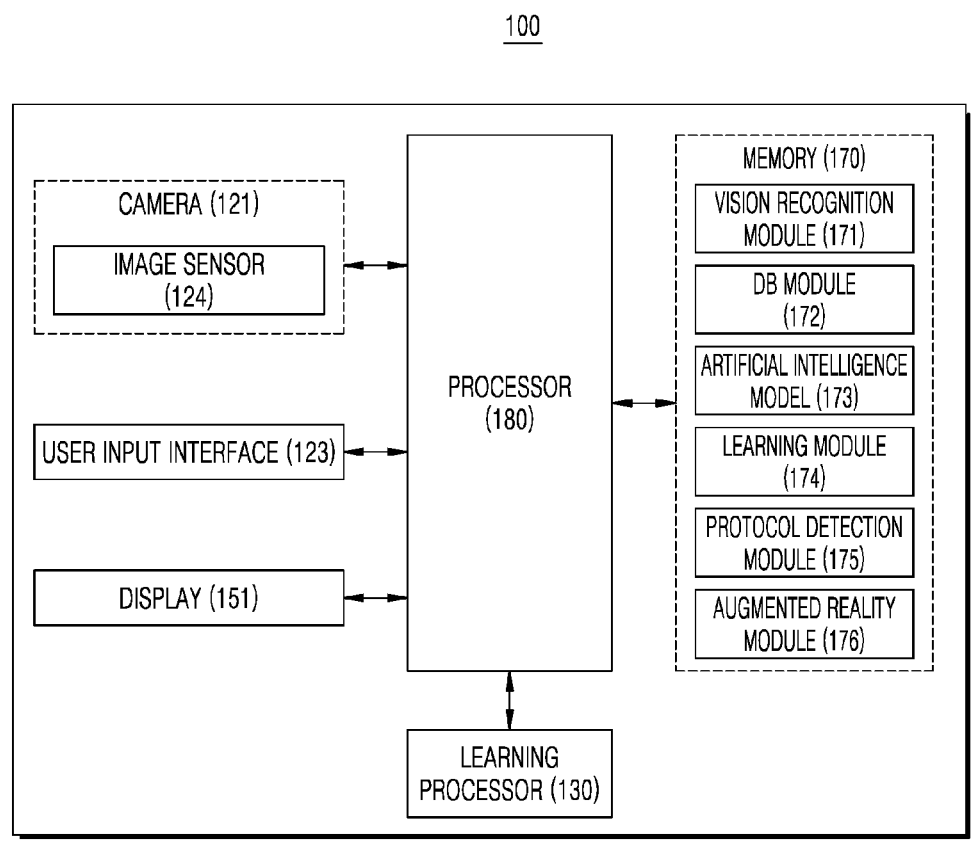

[FIG. 5]
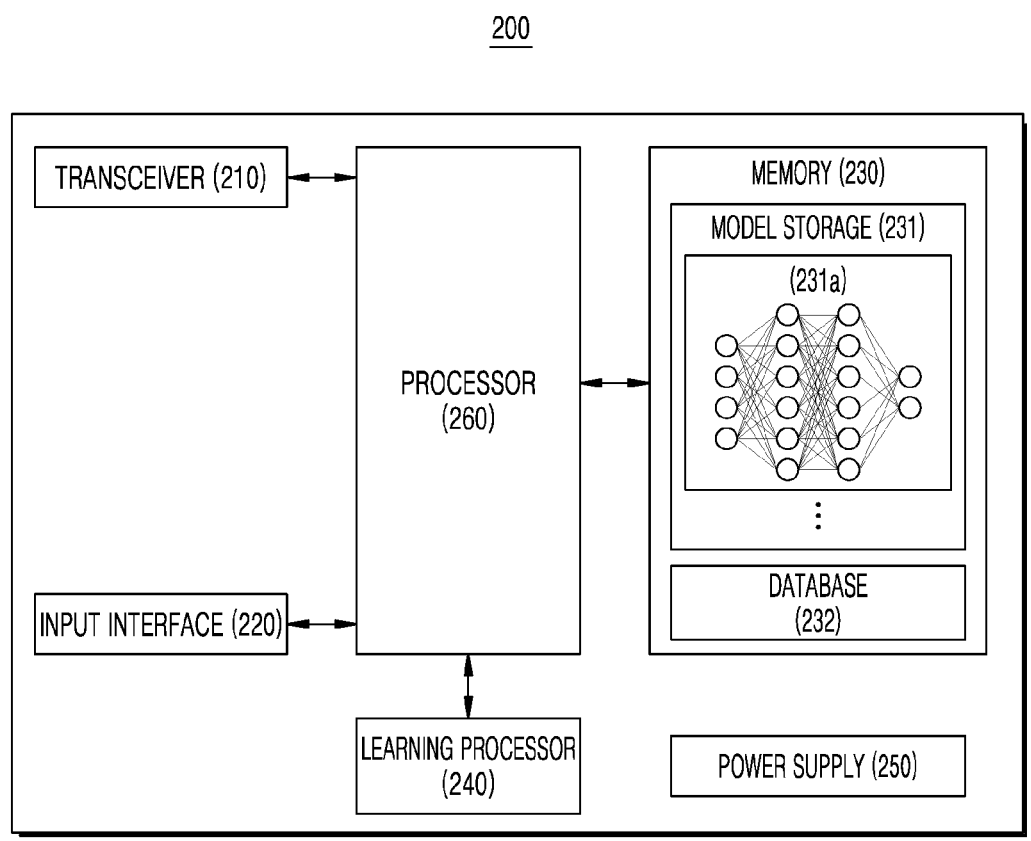

[FIG. 6]
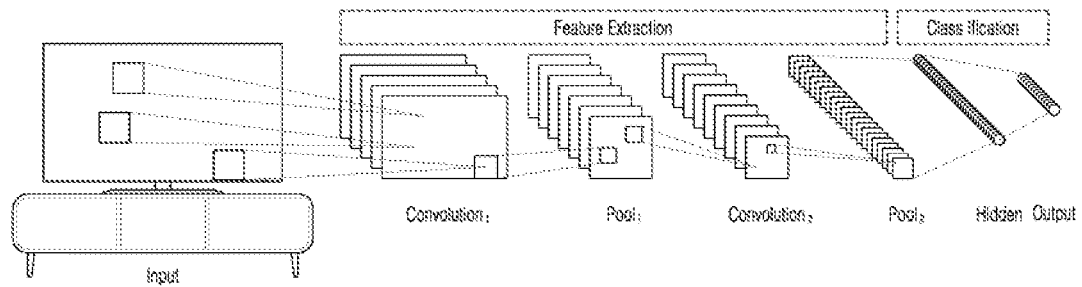
[FIG. 7]
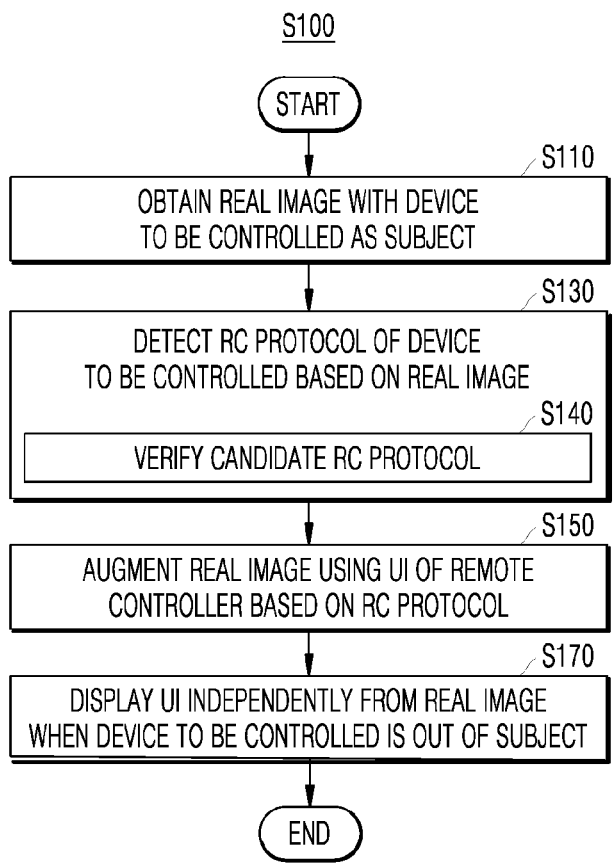

[FIG. 8]
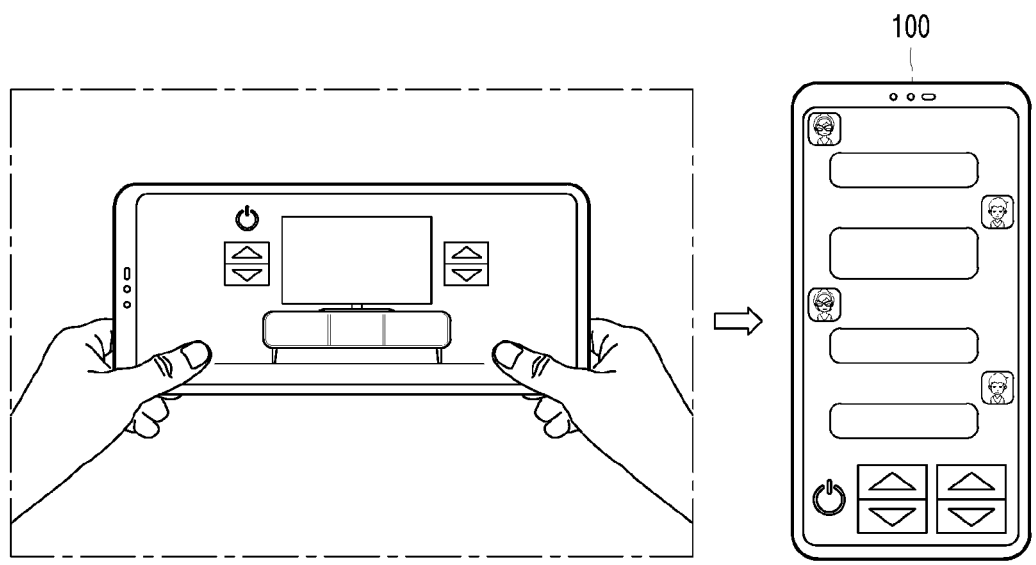

[FIG. 9]
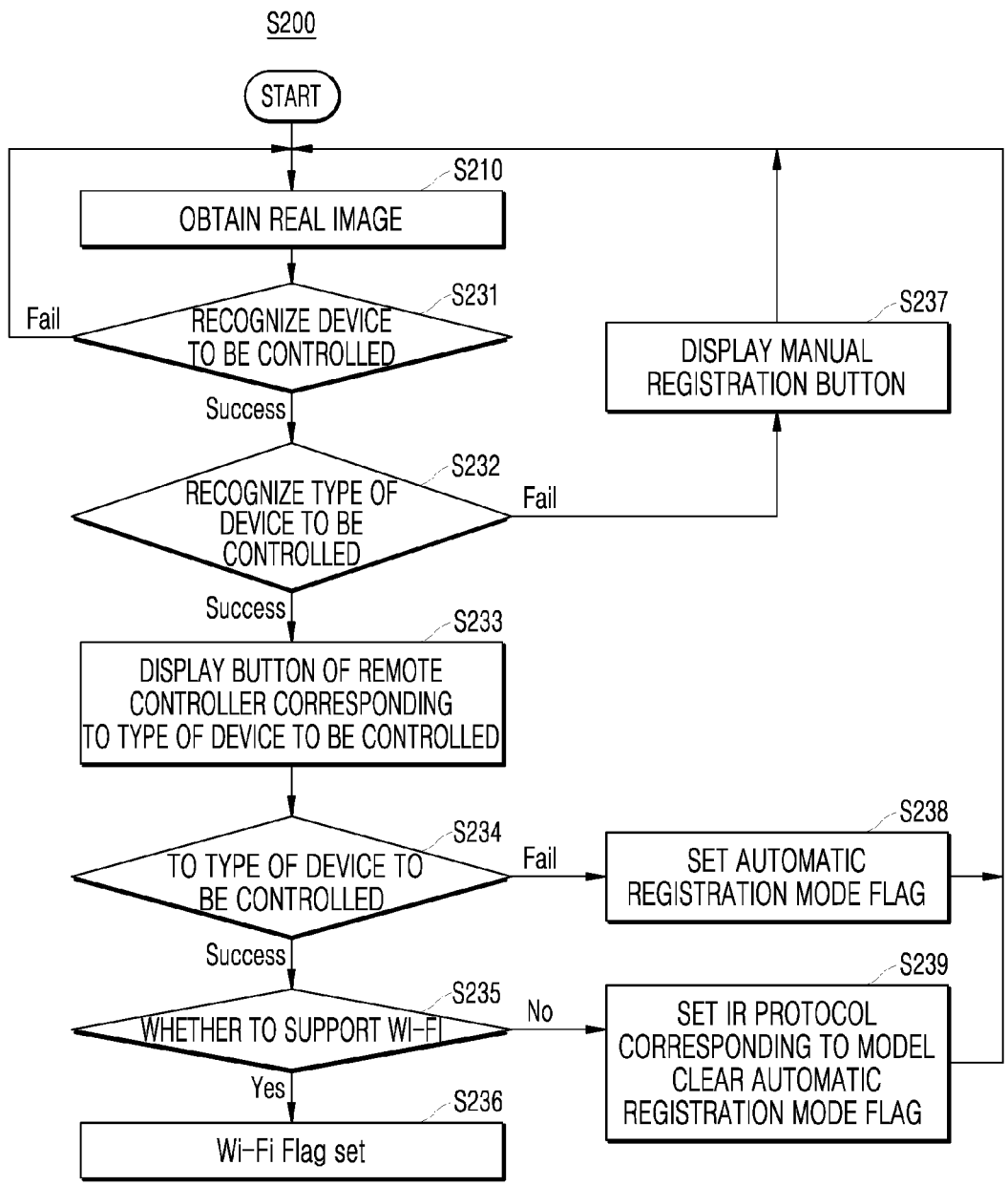

[FIG. 10]
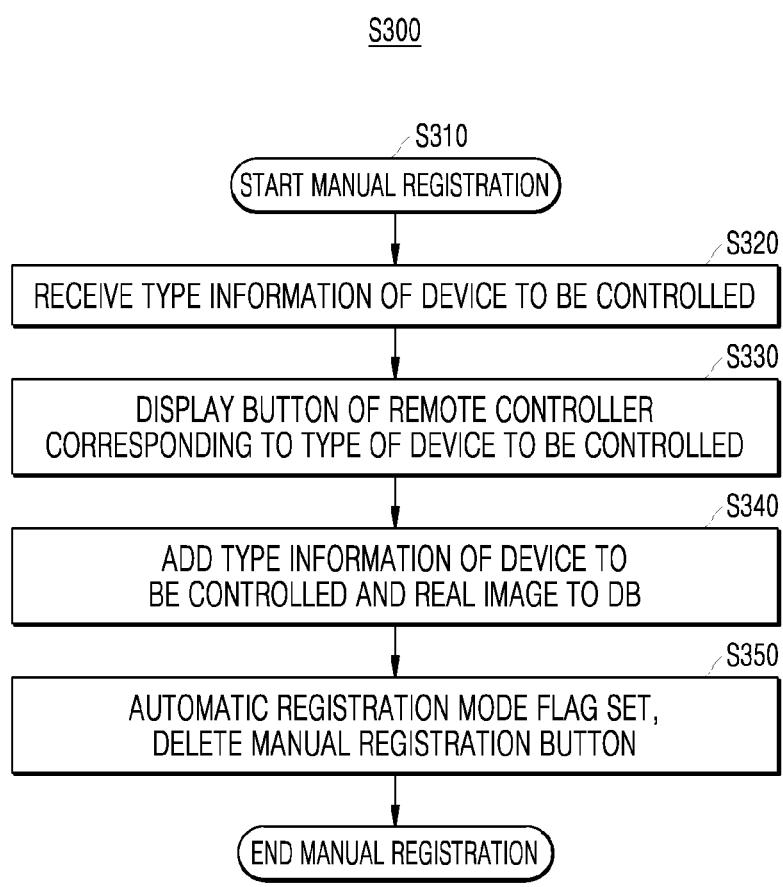

[FIG. 11]
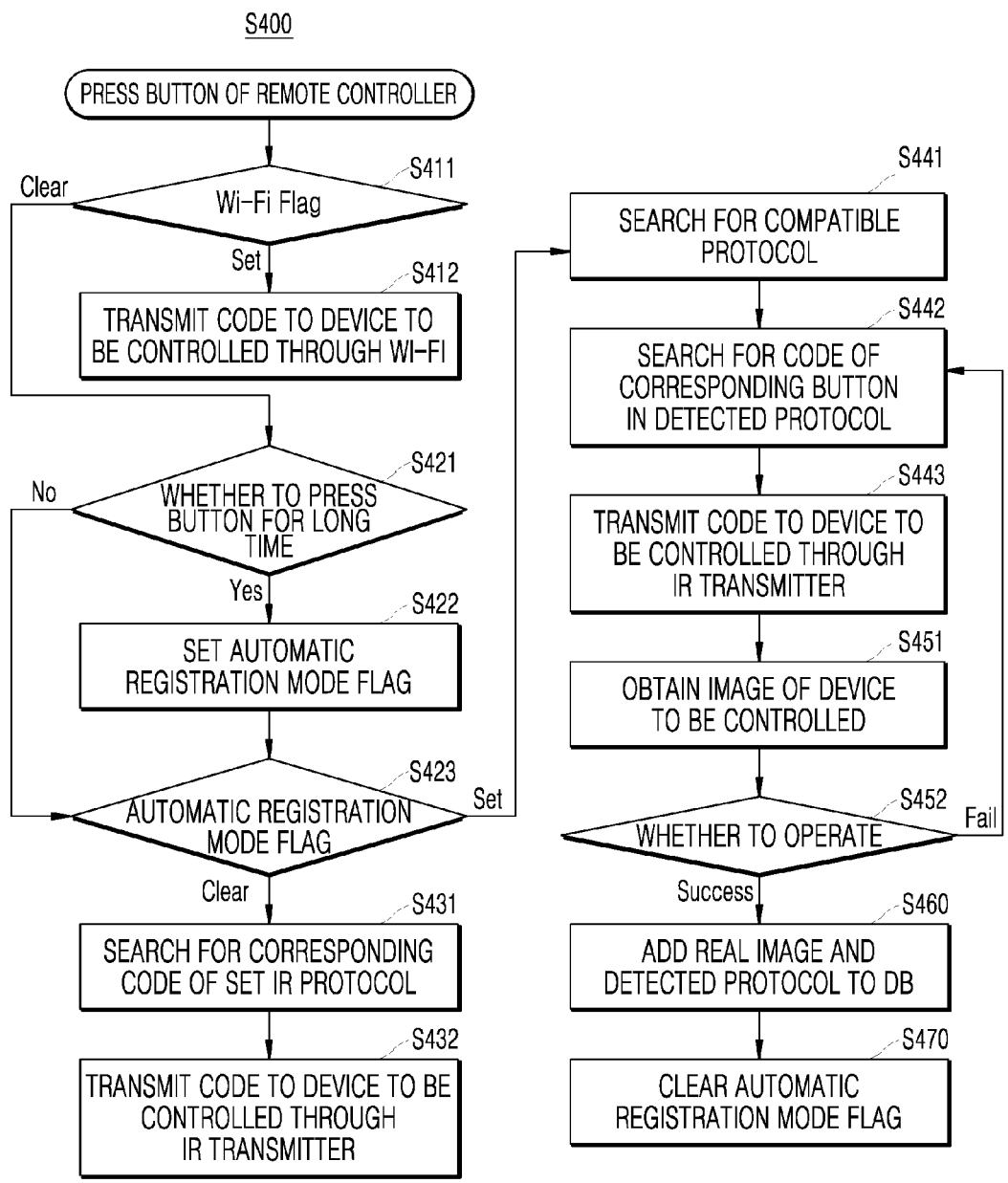

APPARATUS FOR CONTROLLING DEVICE BASED ON AUGMENTED REALITY AND METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2019-0110662, filed on Sep. 6, 2019, the contents of which are hereby incorporated by reference herein in their entirety.

BACKGROUND

1. Technical Field

The present disclosure relates to an augmented reality-based device control apparatus and a method thereof, and more particularly, to a communication terminal which controls an operation of an electronic device based on an augmented reality and a control method thereof.

2. Description of the Related Art

Augmented Reality (AR) is a technology which superimposes a virtual object on a user's view of the real world. The augmented reality is also referred to as Mixed Reality (MR) because it combines the real world with the virtual world having additional information in real time to show a single image.

The augmented reality is a field of virtual reality and is a computer graphic technique that synthesizes virtual objects or information with the real world and looks like the objects in the original environment.

In the Ubiquitous computing environment, usual object and place perform information processing and information exchange through the augmented reality. With regard to the purpose of the augmented reality, the augmented reality may be a combination of a real image and a virtual image and can be defined as real-time interaction between reality and virtuality in a three-dimensional space.

As one related art, an apparatus for controlling a device based on augmented reality using short-range wireless communication and a method thereof is disclosed in Korean Patent Application Publication No. 10-2012-0046605. According to this related art, a control apparatus including an ID register which registers ID information of a control device located therearound and requests and registers detail information about an image and a function of the control device is disclosed. However, according to this related art, in a state in which the detailed information of the control device is not secured in advance, it is impossible to control the control device using the control apparatus.

Further, as another related art, a home network service providing system using a portable terminal is disclosed in Korean Patent Publication No. 10-1989828. According to this related art, it is possible to remotely control a home appliance by transmitting a push message and using an infrared signal corresponding to the push message. However, the related art has a problem in that a push message server, an application server, and two portable terminals are necessary so that the practicality is low due to the complexity of the system configuration.

RELATED ART DOCUMENT

[Patent Document]
Korean Patent Application Publication No. 10-2012-0046605 (Published on May 10, 2012)
Korean Patent Publication No. 10-1989828 (Registered on Jun. 11, 2019)

SUMMARY OF THE INVENTION

An object of the present disclosure is to solve the problem of the related art in that the control device is controlled depending on model information of the control device which is secured in advance.

An object of the present disclosure is to solve the problem of the related art in that the control device is controlled depending on server relay between the control device and a remote controller.

An object of the present disclosure is to provide an augmented reality-based device control apparatus which detects a remote control protocol using an image with a device to be controlled as a subject, as a real image of the augmented reality and using various methods depending on an image recognition level.

While this disclosure includes specific embodiments, it will be apparent to one of ordinary skill in the art that various changes in form and details may be made in these embodiments without departing from the spirit and scope of claims and their equivalents. The embodiments described herein are to be considered in a descriptive sense only, and not for purposes of limitation. Further, it is understood that the objects and advantages of the present disclosure may be embodied by the means and a combination thereof in claims.

According to an aspect of the present disclosure, an augmented reality-based device control method may be configured to include obtaining a real image obtained with a device to be controlled as a subject, as an image which configures an augmented reality (AR)-based remote controller and detecting a remote control (RC) protocol of the device to be controlled through the recognition of the real image. The detecting of an RC protocol of device to be controlled may be configured to include verifying whether to control the device to be controlled through a candidate RC protocol based on whether another device to be controlled operates on the real image.

Further, the obtaining of a real image may be configured to include obtaining a real image including at least one of a monitor and a light indicator which displays an operation status of the device to be controlled.

Further, the detecting of an RC protocol may be configured to include recognizing a device to be controlled which uses the real image to detect device information of the device to be controlled and detecting an RC protocol of a device to be controlled using device information.

Further, the recognizing of a device to be controlled may be configured to include recognizing at least one of a type and a model name of the device to be controlled.

Further, in the recognizing of a device to be controlled, when the recognition of the type of the device to be controlled is succeeded, the detecting of an RC protocol may be configured to further include displaying a virtual input interface of the remote controller corresponding to the type for user's input on the real image.

Further, when, in the recognizing of a device to be controlled, only the type of the device to be controlled is successfully recognized, the detecting of an RC protocol may be configured to include receiving of user input of the remote controller, detecting a candidate protocol including at least one of the RC protocol of the device to be controlled and a compatible protocol compatible with the RC protocol, and detecting an RC protocol of the device to be controlled among candidate protocols by detecting an RC code corresponding to the user's instruction according to trial and error method.

Further, when, in the recognizing of a device to be controlled, the type and the model name of the device to be controlled are not successfully recognized, the detecting of an RC protocol may be configured to include receiving type information of the device to be controlled in accordance with the user input, displaying a virtual input interface of the remote controller corresponding to the type on the image; and adding the real image and the type information to a database.

Further, verifying whether the device to be controlled is controllable may be configured to include determining whether the device to be controlled is controllable using at least one of image recognition and sound recognition.

Further, verifying whether the device to be controlled is controllable may be configured to include transmitting an RC code of the candidate RC protocol in accordance with the user input; recognizing a reaction of the subject which receives the RC code based on whether the device to be controlled operates according to the real image, and detecting a candidate RC protocol in which the device to be controlled reacts the RC code, among the candidate RC protocols as an RC protocol of the device to be controlled.

The augmented reality-based device control method may be configured to further include augmenting the real image using a user interface (UI) of the remote controller which controls the device to be controlled based on the RC protocol.

The augmented reality-based device control method may be configured to further include even though the device to be controlled is out of the range of the subject, displaying the UI of the detected RC protocol-based remote controller independently from the real image.

According to another aspect of the present disclosure, an augmented reality-based device control apparatus includes: a camera which obtains a real image with a device to be controlled as a subject, as an image which configures an augmented reality (AR)-based remote controller; and a processor configured to detect a remote control (RC) protocol of the device to be controlled by recognizing the real image. The processor may verify whether the device to be controlled is controllable through a candidate RC protocol based on whether the device to be controlled operates according to the real image.

Further, the processor may control the camera to obtain a real image including at least one of a monitor and a light indicator which displays an operation status of the device to be controlled.

Further, the processor may recognize the device to be controlled using the real image to detect device information of the device to be controlled and detect an RC protocol of the device to be controlled using the device information.

The augmented reality-based device control apparatus may further include a display configured to display a virtual remote controller to control the device to be controlled based on the augmented reality on the real image. When the type of the device to be controlled is successfully recognized, the processor may control the display to display a virtual input interface of the remote controller corresponding to the type on the real image for user input.

Further, the augmented reality-based device control apparatus is a device configured to display a virtual remote controller configured to control the device to be controlled based on the augmented reality on a real image and may be configured to further include a display including an input device configured to receive user input. When only the type of the device to be controlled is successfully recognized, the processor may control the display to receive a user input of the remote controller, detect a candidate protocol including at least one of the RC protocol of the device to be controlled and a compatible protocol compatible with the RC protocol, and detect an RC protocol of the device to be controlled among candidate protocols by detecting an RC code corresponding to the user's instruction according to trial and error method.

Further, the augmented reality-based device control apparatus is a device configured to display a virtual remote controller configured to control the device to be controlled based on the augmented reality on a real image and may be configured to further include a display including an input device configured to receive user input. When the type and the model name of the device to be controlled are not successfully recognized, the display may receive type information of the device to be controlled in accordance with user input. The processor may control the display to display a virtual input interface of the remote controller corresponding to the type on the image and add the real image and type information to a database.

The augmented reality-based device control apparatus may be configured to further include a microphone which receives a sound. The processor may control at least one of the camera and the microphone to determine whether the device to be controlled is controllable using at least one of image recognition and sound recognition.

The augmented reality-based device control apparatus may be configured to further include a transmitter configured to transmit an RC code of the RC protocol. The processor may control the transmitter to transmit the RC code of a candidate RC protocol in accordance with the user input, controls the display to recognize a reaction of the subject which receives the RC code based on whether the device to be controlled operates according to the real image, and detect a candidate RC protocol in which the device to be controlled reacts the RC code, among the candidate RC protocols as an RC protocol of the device to be controlled.

Even though the device to be controlled is out of a range of the subject, the processor may control the display to display the UI of the detected RC protocol-based remote controller independently from the real image.

According to an aspect of the present disclosure, a method comprises: obtaining a real image of a device to be controlled, wherein the real image is to be used to configure an augmented reality (AR)-based remote controller; and detecting a remote control (RC) protocol of the device by performing a recognition of the device from the real image, wherein the detection of the RC protocol includes verifying whether the device is controllable through a candidate RC protocol by controlling the device in accordance with the real image.

Further, the real image includes at least one of a monitor or a light indicator which displays an operation status of the device.

Further, detecting the RC protocol further includes performing the recognition of the device using the real image in order to detect device information of the device, wherein the device information is used to detect the RC protocol of the device.

Further, performing the recognition of the device further includes recognizing at least one of a type or a model name of the device.

Further, the method further comprises displaying a virtual input interface of the AR-based remote controller with the real image when a type of the device is recognized, wherein the virtual input interface corresponds to the type of the device.

Further, performing the recognition of the device further includes: receiving a user input via the AR-based remote controller when a type of the device is recognized; detecting one or more candidate protocols including at least one of: the RC protocol of the device or a compatible protocol compatible with the RC protocol; and detecting the RC protocol of the device from among the one or more candidate protocols by detecting an RC code corresponding to an instruction from a user.

Further, performing the recognition of the device further includes: receiving a type information of the device in accordance with a user input when the type of the device and a model name of the device are not recognized; displaying a virtual input interface of the AR-based remote controller with the real image, wherein the virtual input interface corresponds to the type of the device; and adding the real image and the type information to a database.

Further, verifying whether the device is controllable further includes determining whether the device is controllable using at least one of image recognition or sound recognition.

Further, verifying whether the device is controllable further includes: displaying a virtual input interface of the AR-based remote controller with the real image, wherein the virtual input interface corresponds to a type of the device; transmitting an RC code of a candidate RC protocol in accordance with a user input received via the virtual input interface of the AR-based remote controller; recognizing a reaction from the device by receiving the RC code based on whether the device operates according to the received user input; and detecting the candidate RC protocol as the RC protocol of the device when the device operates according to the received user input.

Further, the method further comprises augmenting the real image with a user interface (UI) of the AR-based remote controller which controls the device based on the RC protocol.

Further, the method further comprises displaying a UI of the AR-based remote controller independently from the real image when the device is out of a range of the device.

According to another aspect of the present disclosure, an apparatus comprises: a camera configured to obtain a real image of a device to be controlled, wherein the real image is to be used to configure an augmented reality (AR)-based remote controller; and a processor configured to detect a remote control (RC) protocol of the device by performing a recognition of the device from the real image, wherein the detection of the RC protocol includes verifying whether the device is controllable through a candidate RC protocol by controlling the device in accordance with the real image.

Further, the real image includes at least one of a monitor or a light indicator which displays an operation status of the device.

Further, detecting the RC protocol further includes performing the recognition of the device using the real image to detect device information of the device, wherein the device information is used to detect the RC protocol of the device.

Further, the apparatus further comprises: a display configured to display a virtual input interface of the AR-based remote controller to control the device with the real image when a type of the device is recognized, wherein the virtual input interface corresponds to the type of the device; wherein the processor is further configured to control the display displaying the virtual input interface of the AR-based remote controller.

Further, the apparatus further comprises: a display configured to include an input device which receives user input via the AR-based remote controller; wherein the processor is further configured to: control the display to receive the user input via the AR-based remote controller when a type of the device is recognized, detect one or more candidate protocols including at least one of: the RC protocol of the device or a compatible protocol compatible with the RC protocol, and detect the RC protocol of the device from among the one or more candidate protocols by detecting an RC code corresponding to an instruction from a user.

Further, the apparatus further comprises: a display configured to include an input device which receives user input via the AR-based remote controller and receive a type information of the device in accordance with the user input when the type and of the device and a model name of the device are not recognized; wherein the processor is further configured to control the display displaying a virtual input interface of the AR-based remote controller with the real image, wherein the virtual input interface corresponds to the type of the device and add the real image and the type information to a database.

Further, the apparatus further comprises a microphone configured to receive sound, wherein the processor is further configured to control at least one of the camera or the microphone to determine whether the device is controllable using at least one of image recognition or sound recognition.

Further, the apparatus further comprises: a display configured to display a virtual input interface of the AR-based remote controller with the real image, wherein the virtual input interface corresponds to a type of the device; and a transmitter configured to transmit an RC code of the candidate RC protocol, wherein the processor is further configured to: control the transmitter to transmit the RC code of the candidate RC protocol in accordance with a user input received via the virtual input interface of the AR-based controller, control the display to recognize a reaction from the device by receiving the RC code based on whether the device operates according to the received user input; and detect the candidate RC protocol as the RC protocol of the device when the device operates according to the received user input.

Further, the processor is further configured to control a display configured to display a UI of the AR-based remote controller independently from the real image when the device is out of a range of the device.

According to the present disclosure, a device to be controlled may be remotely controlled based on the augmented reality using a remote control protocol which is detected by various methods depending on an image recognition accuracy.

Further, the device to be controlled may be remotely controlled without depending on server relay between a control device and a remote controller.

Further, in a state in which control device information is not secured in advance, a remote controller protocol may be detected by means of image recognition.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is an exemplary diagram of an augmented reality-based device control apparatus according to an embodiment of the present disclosure;

FIG. 2 is an exemplary diagram of a network connected with an augmented reality-based device control apparatus according to an embodiment of the present disclosure;

FIG. 3 is a block diagram of an augmented reality-based device control apparatus according to an embodiment of the present disclosure;

FIG. 4 is a block diagram of a memory in FIG. 3;

FIG. 5 is a block diagram of a learning device according to an embodiment of the present disclosure;

FIG. 6 is an exemplary diagram of a deep learning-based neural network according to an embodiment of the present disclosure;

FIG. 7 is a flowchart of an augmented reality-based device control method according to an embodiment of the present disclosure;

FIG. 8 is an exemplary diagram of S170 in FIG. 7;

FIG. 9 is a flowchart of an augmented reality-based device control method according to an embodiment of the present disclosure;

FIG. 10 is a flowchart of manual registration of a device to be controlled according to an exemplary embodiment of the present disclosure; and FIG. 11 is a flowchart of automatic registration of a device to be controlled according to an exemplary embodiment of the present disclosure.

DETAILED DESCRIPTION

The embodiments disclosed in the present specification will be described in greater detail with reference to the accompanying drawings, and throughout the accompanying drawings, the same reference numerals are used to designate the same or similar components and redundant descriptions thereof are omitted. In the following description, the suffixes "module" and "unit" that are mentioned with respect to the elements used in the present description are merely used individually or in combination for the purpose of simplifying the description of the present invention, and therefore, the suffix itself will not be used to differentiate the significance or function or the corresponding term. Wherever possible, the same reference numbers will be used throughout the drawings to refer to the same or like parts. In the following description, known functions or structures, which may confuse the substance of the present disclosure, are not explained. Further, the accompanying drawings are provided for more understanding of the embodiment disclosed in the present specification, but the technical spirit disclosed in the present invention is not limited by the accompanying drawings. It should be understood that all changes, equivalents, and alternatives included in the spirit and the technical scope of the present invention are included.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is an exemplary diagram of an augmented reality-based device control apparatus according to an embodiment of the present disclosure.

Referring to FIG. 1, an augmented reality-based device control apparatus 100 according to an embodiment of the present disclosure has been illustrated. The augmented reality-based device control apparatus 100 is a control apparatus which controls an operation of a TV based on an augmented reality in which a virtual TV remote controller is displayed on a real image obtained by photographing a device to be controlled, for example, the TV, as a subject. The device control apparatus may be implemented using a mobile terminal, for example, a smart phone which includes a camera which can acquire a real image and a display equipped with an input device so as to input buttons of a virtual remote controller. The augmented reality-based device control apparatus 100 using a smart phone illustrated in FIG. 1 is one of various embodiments and various embodiments of the present disclosure will be described in detail below.

FIG. 2 is an exemplary diagram of a network connected with an augmented reality-based device control apparatus according to an embodiment of the present disclosure.

Referring to FIG. 2, an augmented reality-based device control apparatus 100, a device 300 to be controlled, and a learning device 200, and a network 500 which connects the above-described components to communicate with each other have been illustrated.

The augmented reality-based device control apparatus 100 according to the embodiment of the present disclosure may also be referred to as a terminal 100. Among various embodiments of the augmented reality-based device control apparatus 100, a mobile terminal 100 is focused to describe the augmented reality-based device control apparatus 100 according to an embodiment of the present disclosure. Further, unless other specific assumption or conditions are provided, the description of the mobile terminal 100 may be applied to a different type of communication terminal as it is.

The augmented reality-based device control apparatus 100 recognizes the device 300 to be controlled using a real image obtained by photographing the device 300 to be controlled as a subject and controls the device 300 to be controlled using a remote control protocol based on information of the device 300 to be controlled extracted based on the recognition. Here, the augmented reality-based device control apparatus 100 may use a short-range communication module or an infrared signal as a transceiver.

The augmented reality-based device control apparatus 100 may recognize the device 300 to be controlled using an artificial intelligence (AI) algorithm. The augmented reality-based device control apparatus 100 may use an artificial intelligence model which is provided after being trained by the learning device 200. The artificial intelligence model may be stored in the learning device 200 or in the augmented reality-based device control apparatus 100.

AI is one field of computer science and information technology that studies methods to make computers mimic intelligent human behaviors such as reasoning, learning, self-improving and the like.

In addition, AI does not exist on its own, but is rather directly or indirectly related to a number of other fields in computer science. In recent years, there have been numerous attempts to introduce an element of AI into various fields of information technology to solve problems in the respective fields.

Machine learning is an area of AI that includes a field of study that gives computers the capability to learn without being explicitly programmed.

Specifically, Machine Learning can be a technology for researching and constructing a system for learning, predicting, and improving its own performance based on empirical data and an algorithm for the same. The algorithms of Machine Learning take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general Single-Layer Neural Network is composed of an input layer and an output layer.

In addition, a general Multi-Layer Neural Network is composed of an Input layer, one or more Hidden layers, and an Output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The Output layer receives a signal from the Hidden layer, and outputs an output value based on the received signal. The Input signal between neurons is multiplied by each connection strength (weight) and then summed, and if the sum is larger than the threshold of the neuron, the neuron is activated to output the output value obtained through the activation function.

Meanwhile, the Deep Neural Network including a plurality of Hidden layers between the Input layer and the Output layer can be a representative Artificial Neural Network that implements Deep Learning, which is a type of Machine Learning technology.

The Artificial Neural Network can be trained by using training data. Herein, the training can mean a process of determining a parameter of the Artificial Neural Network by using training data in order to achieve the objects such as classification, regression, clustering, etc. of input data. As a representative example of the parameter of the Artificial Neural Network, there can be a weight given to a synapse or a bias applied to a neuron.

The Artificial Neural Network trained by the training data can classify or cluster the input data according to the pattern of the input data.

Meanwhile, the Artificial Neural Network trained by using the training data can be referred to as a trained model in the present specification.

Next, the learning method of the Artificial Neural Network will be described.

The learning method of the Artificial Neural Network can be largely classified into Supervised Learning, Unsupervised Learning, Semi-supervised Learning, and Reinforcement Learning.

The Supervised Learning is a method of the Machine Learning for inferring one function from the training data.

Then, among the thus inferred functions, outputting consecutive values is referred to as regression, and predicting and outputting a class of an input vector is referred to as classification.

In the Supervised Learning, the Artificial Neural Network is learned in a state where a label for the training data has been given.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, in the present specification, setting the label to the training data for training of the Artificial Neural Network is referred to as labeling the labeling data on the training data.

Training data and labels corresponding to the training data together may form a single training set, and as such, they may be inputted to an artificial neural network as a training set.

Meanwhile, the training data represents a plurality of features, and the labeling the label on the training data can mean that the feature represented by the training data is labeled. In this case, the training data can represent the feature of the input object in the form of a vector.

The Artificial Neural Network can infer a function of the relationship between the training data and the labeling data by using the training data and the labeling data. Then, the parameter of the Artificial Neural Network can be determined (optimized) by evaluating the function inferred from the Artificial Neural Network.

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves guessing the label of unlabeled training data, and then using this guessed label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

The Reinforcement Learning can be mainly performed by a Markov Decision Process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Further, the augmented reality-based device control apparatus 100 retrains the artificial intelligence model which is trained by the learning device 200 using user's personal data, based on a transfer learning method. The augmented reality-based device control apparatus 100 may use various artificial intelligence application programs provided from a server 200 during a process of executing or retraining the artificial intelligence model.

The server 200 may be configured to include the learning device 200 which trains the artificial intelligence model and one or more servers which provide various functions, for example, a learning server which trains the artificial intelligence model, a file server which provides various files related to the artificial intelligence model, a database server, a web server, an application server, and a cloud server. Therefore, the server 200 may be referred to as the learning device 200 in some cases. The learning device 200 will be described in more detail below.

The network 500 may be an appropriate communication network including wired and wireless networks, such as a local area network (LAN), a wide area network (WAN), the Internet, the Intranet, and the extranet and a mobile network such as cellular, Third-Generation Cell-Phone Technology (3G), long term evolution (LTE), Fifth-Generation wireless (5G), a Wi-Fi network, an AD hoc network, and a combination thereof.

The network 500 may include connection of network elements such as a hub, a bridge, a router, a switch, and a gateway. The network 500 may include one or more connected networks including a public network such as the Internet and a private network such as a secure corporate private network, for example, multiple network environments. Access to the network 500 may be provided by one or more wired or wireless access networks.

The terminal 100 may transmit and receive data with a server 200 which is a learning device 200, through a 5G network. Specifically, the terminal 100 may perform data communication with the learning device 200 using at least one service of enhanced mobile broadband (eMBB), ultra-reliable and low latency communications (URLLC), and massive machine-type communications (mMTC) through the 5G network.

eMBB (enhanced mobile broadband) is a mobile broadband service, and multimedia contents, wireless data access, etc. are provided through eMBB (enhanced mobile broadband). Further, more improved mobile services such as a hotspot and a wideband coverage for receiving mobile traffic that are tremendously increasing can be provided through eMBB. Large traffic can be received to an area with little mobility and high density of users through a hotspot. A wide and stable wireless environment and user mobility can be secured by a wideband coverage.

A URLLC (ultra-reliable and low latency communications) service defines very severer requirements than existing LTE in terms of reliability in data transmission/reception and transmission delay, and 5G services for production process automation at industrial sites, telemedicine, telesurgery, transportation, safety, etc. are representative.

mMTC (massive machine-type communications) is a service that is not sensitive to transmission delay requiring a relatively small amount of data transmission. A large number of terminals more than common mobile phones such as sensors can simultaneously connect with a wireless access network by mMTC. In this case, the price of the communication module of a terminal should be low and a technology improved to increase power efficiency and save power is required to enable operation for several years without replacing or recharging a battery.

FIG. 3 is a block diagram of an augmented reality-based device control apparatus according to an embodiment of the present disclosure.

The terminal 100 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, a digital signage.

That is, the terminal 100 may be implemented as various home appliances used at home and also applied to a fixed or mobile robot.

The terminal 100 may perform a function of a voice agent. The voice agent may be a program which recognizes a voice of the user and outputs a response appropriate for the recognized voice of the user as a voice.

Referring to FIG. 3, the terminal 100 includes a wireless transceiver 110, an input interface 120, a learning processor 130, a sensor 140, an output interface 150, an input/output (I/O) connector 160, a memory 170, a processor 180, and a power supply 190.

A trained model may be loaded in the terminal 100.

In the meantime, the learning model may be implemented by hardware, software, or a combination of hardware and software. When a part or all of the learning model is implemented by software, one or more commands which configure the learning model may be stored in the memory 170.

The wireless transceiver 110 may include at least one of a broadcast receiver 111, a modem 112, a data transceiver 113, a short-range transceiver 114, and a global navigation satellite system (GNSS) sensor 115.

The broadcast receiver 111 receives a broadcasting signal and/or broadcasting related information from an external broadcasting management server through a broadcasting channel.

The modem 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The data transceiver 113 refers to a module for wireless internet access and may be built in or external to the terminal 100. The data transceiver 113 may be configured to transmit/receive a wireless signal in a communication network according to wireless internet technologies.

The wireless internet technologies may include Wireless LAN (WLAN), wireless local area network products based on Institute of Electrical and Electronics Engineers 802.11 standards (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range transceiver 114 may support short-range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi Direct, and Wireless Universal Serial Bus (USB) technologies.

The GNSS sensor 115 is a module for obtaining the location (or the current location) of a mobile terminal, and its representative examples include a global positioning system (GPS) module or a Wi-Fi module. For example, the mobile terminal may obtain its position by using a signal transmitted from a GPS satellite through the GPS module.

The input interface 120 may include a camera 121 which inputs an image signal, a microphone 122 which receives an audio signal, and a user input interface 123 which receives information from the user.

Voice data or image data collected by the input interface 120 is analyzed to be processed as a control command of the user.

The input interface 120 may obtain training data for training a model and input data used to obtain an output using the trained model.

The input interface 120 may obtain input data which is not processed, and, in this case, the processor 180 or the learning processor 130 pre-processes the obtained data to generate training data to be input to the model learning or pre-processed input data.

In this case, the pre-processing on the input data may refer to extracting of an input feature from the input data.

The input interface 120 is provided to input image information (or signal), audio information (or signal), data, or information input from the user and in order to input the image information, the terminal 100 may include one or a plurality of cameras 121.

The camera 121 processes an image frame such as a still image or a moving image obtained by an image sensor in a video call mode or a photographing mode. The processed image frame may be displayed on the display 151 or stored in the memory 170.

The microphone 122 processes an external sound signal as electrical voice data. The processed voice data may be utilized in various forms in accordance with a function which is being performed by the terminal 100 (or an application program which is being executed). In the meantime, in the microphone 122, various noise removal algorithms which remove a noise generated during the process of receiving the external sound signal may be implemented.

The user input interface 123 receives information from the user and when the information is input through the user input interface 123, the processor 180 may control the operation of the terminal 100 so as to correspond to the input information.

The user input interface 123 may include a mechanical input interface (or a mechanical key, for example, a button located on a front, rear, or side surface of the terminal 100, a dome switch, a jog wheel, or a jog switch) and a touch type input interface. For example, the touch type input interface may be formed by a virtual key, a soft key, or a visual key which is disposed on the touch screen through a software process or a touch key which is disposed on a portion other than the touch screen.

The learning processor 130 learns the model configured by an artificial neural network using the training data.

Specifically, the learning processor 130 repeatedly trains the artificial neural network using the aforementioned various learning techniques to determine optimized model parameters of the artificial neural network.

In this specification, the artificial neural network which is trained using training data to determine parameters may be referred to as a learning model or a trained model.

In this case, the learning model may be used to deduce a result for the new input data, rather than the training data.

The learning processor 130 may be configured to receive, classify, store, and output information to be used for data mining, data analysis, intelligent decision making, and machine learning algorithm and techniques.

The learning processor 130 may include one or more memory units configured to store data which is received, detected, sensed, generated, previously defined, or output by another component, device, the terminal, or a device which communicates with the terminal.

The learning processor 130 may include a memory which is combined with or implemented in the terminal. In some exemplary embodiments, the learning processor 130 may be implemented using the memory 170.

Selectively or additionally, the learning processor 130 may be implemented using a memory related to the terminal, such as an external memory which is directly coupled to the terminal or a memory maintained in the server which communicates with the terminal.

According to another exemplary embodiment, the learning processor 130 may be implemented using a memory maintained in a cloud computing environment or other remote memory locations accessible by the terminal via a communication method such as a network.

The learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory 230 of the learning device 200, a memory maintained in a cloud computing environment or other remote memory locations accessible by the terminal via a communication method such as a network.

Information stored in the learning processor 130 may be used by the processor 180 or one or more controllers of the terminal using an arbitrary one of different types of data analysis algorithms and machine learning algorithms.

As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processor 180 may determine or predict at least one executable operation of the terminal based on information which is determined or generated using the data analysis and the machine learning algorithm. To this end, the processor 180 may request, search, receive, or utilize the data of the learning processor 130 and control the terminal to execute a predicted operation or a desired operation among the at least one executable operation.

The processor 180 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The processor 180 may include sub modules which enable operations involving voice and natural language voice processing, such as an I/O processing module, an environmental condition module, a speech to text (STT) processing module, a natural language processing module, a workflow processing module, and a service processing module.

The sub modules may have an access to one or more systems or data and a model, or a subset or a super set thoseof in the terminal. Further, each of the sub modules may provide various functions including a glossarial index, user data, a workflow model, a service model, and an automatic speech recognition (ASR) system.

According to another exemplary embodiment, another aspect of the processor 180 or the terminal may be implemented by the above-described sub module, a system, data, and a model.

In some exemplary embodiments, based on the data of the learning processor 130, the processor 180 may be configured to detect and sense requirements based on contextual conditions expressed by user input or natural language input or user's intention.

The processor 180 may actively derive and obtain information required to completely determine the requirement based on the contextual conditions or the user's intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting of information stored in the memory 170, or receiving information from other equipment, an entity, or an external storage device through a transceiver.

The processor 180 collects usage history information from the terminal and stores the information in the memory 170.

The processor 180 may determine best matching to execute a specific function using stored usage history information and predictive modeling.

The processor 180 may receive or sense surrounding environment information or other information through the sensor 140.

The processor 180 may receive a broadcasting signal and/or broadcasting related information, a wireless signal, or wireless data through the wireless transceiver 110.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

When the operation of the terminal is determined based on data analysis and a machine learning algorithm and technology, the processor 180 may control the components of the terminal to execute the determined operation. Further, the processor 180 may control the equipment in accordance with the control command to perform the determined operation.

When a specific operation is performed, the processor 180 analyzes history information indicating execution of the specific operation through the data analysis and the machine learning algorithm and technology and updates the information which is previously learned based on the analyzed information.

Therefore, the processor 180 may improve precision of a future performance of the data analysis and the machine learning algorithm and technology based on the updated information, together with the learning processor 130.

The sensor 140 may include one or more sensors which sense at least one of information in the mobile terminal, surrounding environment information around the mobile terminal, and user information.

For example, the sensor 140 may include at least one of a proximity sensor, an illumination sensor, a touch sensor, an acceleration sensor, a magnetic sensor, a G-sensor, a gyroscope sensor, a motion sensor, a red, green, blue (RGB) sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), and a chemical sensor (for example, an electronic nose, a healthcare sensor, or a biometric sensor). On the other hand, the terminal 100 disclosed in the present disclosure may combine various kinds of information sensed by at least two of the above-mentioned sensors and may use the combined information.

The output interface 150 is intended to generate an output related to a visual, aural, or tactile stimulus and may include at least one of a display 151, a speaker 152, a haptic actuator 153, and a light emitting diode (LED) 154.

The display 151 displays (outputs) information processed in the terminal 100. For example, the display 151 may display execution screen information of an application program driven in the terminal 100 and user interface (UI) and graphic user interface (GUI) information in accordance with the execution screen information.

The display 151 forms a mutual layered structure with a touch sensor or is formed integrally to be implemented as a touch screen. The touch screen may simultaneously serve as a user input interface 123 which provides an input interface between the terminal 100 and the user and provide an output interface between the terminal 100 and the user.

The speaker 152 may output audio data received from the wireless transceiver 110 or stored in the memory 170 in a call signal reception mode, a phone-call mode, a recording mode, a voice recognition mode, or a broadcasting reception mode.

The speaker 152 may include at least one of a receiver, a speaker, and a buzzer.

The haptic actuator 153 may generate various tactile effects that the user may feel. A representative example of the tactile effect generated by the haptic module 153 may be vibration.

The LED 154 outputs a signal for notifying occurrence of an event using light of a light source of the terminal 100. Examples of the event generated in the terminal 100 may be message reception, call signal reception, missed call, alarm, schedule notification, email reception, and information reception through an application.

The I/O connector 160 serves as a passage with various types of external devices which are connected to the terminal 100. The I/O connector 160 may include at least one of a wired/wireless headset port, an external charger port, a wired/wireless data port, a memory card port, a port which connects a device equipped with an identification module, an audio I/O port, a video I/O port, and an earphone port. The terminal 100 may perform appropriate control related to the connected external device in accordance with the connection of the external device to the I/O connector 160.

In the meantime, the identification module is a chip in which various information for authenticating a usage right of the terminal 100 is stored and includes a user identification module (UIM), a subscriber identify module (SIM), and a universal subscriber identity module (USIM). The device with an identification module (hereinafter, "identification device") may be manufactured as a smart card. Therefore, the identification device may be connected to the terminal 100 through the I/O connector 160.

The memory 170 stores data which supports various functions of the terminal 100.

The memory 170 may store various application programs (or applications) driven in the terminal 100, data for the operation of the terminal 100, commands, and data (for example, at least one algorithm information for machine learning) for the operation of the learning processor 130.

The memory 170 may store the model which is learned in the learning processor 130 or the learning device 200.

If necessary, the memory 170 may store the trained model by dividing the model into a plurality of versions depending on a training timing or a training progress.

In this case, the memory 170 may store input data obtained from the input interface 120, learning data (or training data) used for model learning, a learning history of the model, and so forth.

In this case, the input data stored in the memory 170 may be not only data which is processed to be suitable for the model learning but also input data itself which is not processed.

In addition to the operation related to the application program, the processor 180 may generally control an overall operation of the terminal 100. The processor 180 may process a signal, data, or information which is input or output through the above-described components or drives the application programs stored in the memory 170 to provide or process appropriate information or functions to the user.

Further, in order to drive the application program stored in the memory 170, the processor 180 may control at least some of components described with reference to FIG. 3. Moreover, the processor 180 may combine and operate at least two of components included in the terminal 100 to drive the application program.

In the meantime, as described above, the processor 180 may control an operation related to the application program and an overall operation of the terminal 100. For example, when the state of the terminal satisfies a predetermined condition, the processor 180 may execute or release a locking state which restricts an input of a control command of a user for the applications.

The power supply 190 is applied with external power or internal power to supply the power to the components included in the terminal 100 under the control of the processor 180. The power supply 190 includes a battery and the battery may be an embedded battery or a replaceable battery.

FIG. 4 is a block diagram of a memory in FIG. 3.

Referring to FIG. 4, components of the memory 170 included in the terminal 100 has been briefly illustrated. In the memory 170, various computer program modules may be loaded. A vision recognition module 171, a database (DB) module 172, an artificial intelligence model 173, a learning module 174, a protocol detection module 175, and an augmented reality module 176 as application programs may be included in the scope of the computer program loaded in the memory 170, as well as the operating system and a system program which manages hardware.

A function of recognizing a type and a model of the device 300 to be controlled using a real image obtained with the device 300 to be controlled which is related to the vision recognition module 171 as a subject may be performed by various arithmetic functions of the processor 180.

A function of searching for a remote-control code and a protocol and updating a database using a protocol database related to the database module 172 may be performed by various arithmetic functions of the processor 180.

A function of analyzing and classifying features of images using a neural network based on machine learning or deep learning related to the artificial intelligence model 173 may be performed by various arithmetic functions of the processor 180.

A function of training and retraining a neural network based on machine learning or deep learning related to the learning module 174 may be performed by various arithmetic functions of the processor 180.

A function of transmitting an RC) code and detecting an RC protocol using a candidate RC protocol related to the protocol detection module 175 may be performed by various arithmetic functions of the processor 180.

A function of controlling UI based on augmented reality using a real image related to the augmented reality module 176 and a virtual remote controller may be performed by various arithmetic functions of the processor 180.

FIG. 5 is a block diagram of a learning device according to an embodiment of the present disclosure.

The learning device 200 is a device or a server which is separately configured at the outside of the terminal 100 and may perform the same function as the learning processor 130 of the terminal 100.

That is, the learning device 200 may be configured to receive, classify, store, and output information to be used for data mining, data analysis, intelligent decision making, and machine learning algorithms. Here, the machine learning algorithm may include a deep learning algorithm.

The learning device 200 may communicate with at least one terminal 100 and derive a result by analyzing or learning the data on behalf of the terminal 100. Here, the meaning of "on behalf of the other device" may be distribution of a computing power by means of distributed processing.

The learning device 200 of the artificial neural network refers to various devices for learning an artificial neural network and normally, refers to a server, and also referred to as a learning device or a learning server.

Specifically, the learning device 200 may be implemented not only by a single server, but also by a plurality of server sets, a cloud server, or a combination thereof.

That is, the learning device 200 is configured as a plurality of learning devices to configure a learning device set (or a cloud server) and at least one learning device 200 included in the learning device set may derive a result by analyzing or learning the data through the distributed processing.

The learning device 200 may transmit a model trained by the machine learning or the deep learning to the terminal 100 periodically or upon the request.

Referring to FIG. 5, the learning device 200 may include a transceiver 210, an input interface 220, a memory 230, a learning processor 240, a power supply 250, a processor 260, and so forth.

The transceiver 210 may correspond to a configuration including the wireless transceiver 110 and the I/O connector 160 of FIG. 3. That is, the transceiver may transmit and receive data with the other device through wired/wireless communication or an interface.

The input interface 220 is a configuration corresponding to the input interface 120 of FIG. 3 and may receive the data through the transceiver 210 to obtain data.

The input interface 220 may obtain input data for acquiring an output using training data for model learning and a trained model.

The input interface 220 may obtain input data which is not processed, and, in this case, the processor 260 may pre-process the obtained data to generate training data to be input to the model learning or pre-processed input data.

In this case, the pre-processing on the input data performed by the input interface 220 may refer to extracting of an input feature from the input data.

The memory 230 is a configuration corresponding to the memory 170 of FIG. 3.

The memory 230 may include a model storage 231, a database 232, and so forth.

The model storage 231 stores a model (or an artificial neural network 231a) which is learning or trained through the learning processor 240 and when the model is updated through the learning, stores the updated model.

If necessary, the model storage 231 stores the trained model by dividing the model into a plurality of versions depending on a training timing or a training progress.

The artificial neural network 231a illustrated in FIG. 5 is one example of artificial neural networks including a plurality of hidden layers but the artificial neural network of the present disclosure is not limited thereto.

The artificial neural network 231a may be implemented by hardware, software, or a combination of hardware and software. When a part or all of the artificial neural network 231a is implemented by the software, one or more commands which configure the artificial neural network 231a may be stored in the memory 230.

The database 232 stores input data obtained from the input interface 220, learning data (or training data) used to learn a model, a learning history of the model, and so forth.

The input data stored in the database 232 may be not only data which is processed to be suitable for the model learning but also input data itself which is not processed.

The learning processor 240 is a configuration corresponding to the learning processor 130 of FIG. 3.

The learning processor 240 may train (or learn) the artificial neural network 231a using training data or a training set.

The learning processor 240 may immediately obtain data which is obtained by pre-processing input data obtained by the processor 260 through the input interface 220 to learn the artificial neural network 231a or obtain the pre-processed input data stored in the database 232 to learn the artificial neural network 231a.

Specifically, the learning processor 240 repeatedly may train the artificial neural network 231a using various learning techniques described above to determine optimized model parameters of the artificial neural network 231a.

In this specification, the artificial neural network which is trained using training data to determine parameters may be referred to as a learning model or a trained model.

In this case, the learning model may be loaded in the learning device 200 to deduce the result value or may be transmitted to the other device such as the terminal 100 through the transceiver 210 to be loaded.

Further, when the learning model is updated, the updated learning model may be transmitted to the other device such as the terminal 100 via the transceiver 210 to be loaded.

The power supply 250 is a configuration corresponding to the power supply 190 of FIG. 3.

A redundant description for corresponding configurations will be omitted.

In addition, the learning device 200 may evaluate the artificial intelligence model 231a and update the artificial intelligence model 231a for better performance even after the evaluation and provide the updated artificial intelligence model 231a to the terminal 100. Here, the terminal 100 may perform a series of steps performed by the learning device 200 solely in a local area or together with the learning device 200 through the communication with the learning device 200. For example, the terminal 100 allows the artificial intelligence model 173 in a local area to learn a personal pattern of the user through the secondary learning using the user's personal data to update the artificial intelligence model 173 which is downloaded from the learning device 200.

The augmented reality-based device control apparatus 100 according to the embodiment of the present disclosure may recognize the device 300 to be controlled using the artificial intelligence algorithm. The recognition of the device 300 to be controlled corresponds to object detection or object recognition and includes identification of a type and a model of the device 300 to be controlled and a position thereof.

Two deep learning-based object recognition methods according to an embodiment of the present disclosure may be mainly used. One of the methods basically trains the deep learning model and the other method uses a deep learning model which is already trained.

A basic training of the deep learning model, that is, the training of a deep network requires a process of collecting very massive training datasets to which labels are designated and designing a network architecture to train a feature and complete a model. Even though an excellent result may be obtained through deep network training, this approach requires a huge amount of training datasets and a layer and a weight need to be set to a network to be used, such as CNN.

A transfer learning method which is a process including a method of delicately adjusting a pre-trained model may be used for a plurality of deep learning application programs used for a pre-trained deep learning model. According to this transfer learning method, new data including a class which has not been known in the related art may be injected to a deep network using an existing network such as AlexNet or GoogLeNet.

When the transfer method is used, the model is trained in advance with thousands or millions of images so that the time may be saved, and the result may be quickly produced.

The deep learning model provides a high level of accuracy to recognize a type and a model of the device 300 to be controlled, but in order to accurately predict, a large amount of training datasets, that is, a real image obtained by photographing the device 300 to be controlled is necessary.

The augmented reality-based device control apparatus 100 according to an embodiment of the present disclosure which is one of deep learning models analyzes the obtained real image, extracts a feature of the device 300 to be controlled, and uses a CNN model trained with the extracted feature. The CNN may classify the extracted feature into a unique category to recognize a type and a model of the device 300 to be controlled.

The machine learning-based object recognition may include manually processes of extracting a feature and classifying the extracted feature. For example, histogram of oriented gradients (HOG) feature extraction using a support vector machine (SVM) machine learning algorithm may be used as an embodiment of the present disclosure. As the other feature extracting algorithm, Harris corner, Shi & Tomasi, SIFT-DoG, FAST, AGAST, and major invariant features (SURF, BRIEF, ORB) methods may be used.

FIG. 6 is an exemplary diagram of a deep learning-based neural network according to an embodiment of the present disclosure.

Referring to FIG. 6, a structure of a convolutional neural network (CNN) which performs the deep learning has been illustrated.

The CNN may be divided into an area where a feature of the image is extracted and an area where the class is classified. The feature extracting area is configured by laminating a plurality of convolution layers and pooling layers. The convolution layer is an essential element which reflects an activation function after applying a filter to input data. The pooling layer which is next to the convolution layer is a selective layer. At the end of the CNN, a fully connected layer for image classification is added. A flatten layer which changes the image shape into an arranged shape is located between a portion of extracting a feature of the image and an area which classifies the image.

The CNN calculates a convolution while a filter circulates the input data for extraction of the feature of the image and creates a feature map using the calculating result. A shape of the output data is changed in accordance with a size of a convolution layer filter, a stride, whether to apply padding, or a max pooling size.

FIG. 7 is a flowchart of an augmented reality-based device control method according to an embodiment of the present disclosure.

Referring to FIG. 7, an augmented reality-based device control method S100 may be configured to include obtaining a real image with a device to be controlled as a subject in step S110, detecting a remote control (RC) protocol of the device to be controlled based on the real image in step S130, and augmenting the real image using a user interface (UI) of an RC protocol-based remote controller in step S150. When the device to be controlled is out of the subject, the augmented reality-based device control method S100 may further include independently displaying the remote controller on the real image in step S170.

First, the augmented reality-based device control apparatus 100, that is, the terminal 100 may obtain a real image with the device 300 to be controlled as a subject using a camera 121 in step S110.

The obtaining S110 of a real image may include obtaining a real image including at least one of a monitor and a light indicator which displays an operation status of the device to be controlled. For example, when the power of the device 300 to be controlled is switched from OFF to ON, a TV screen notifying whether the device to be controlled operates according to the real image, an LED of a control panel notifying that the device to be controlled operates by changing the light may correspond to examples of the monitor and the light indicator which indicate an operating status. This is because at least one of the monitor or the light indicator may notify that an RC protocol detected from candidate RC protocols can be registered as an RC protocol which controls the device 300 to be controlled.

The processor 180 may detect the RC protocol of the device 300 to be controlled by recognizing a real image in step S130. A process of recognizing the device 300 to be controlled in the real image may be described as a series of processes of recognizing an object which is the device 300 to be controlled and recognizing a type and a model of the device 300 to be controlled. This will be described in detail with reference to FIG. 8 below.

The processor 180 detects information on the device 300 to be controlled through computer vision recognition and detects an RC protocol which can control the device 300 to be controlled using the detected information in step S130.

When the processor 180 successfully recognizes the type of the device 300 to be controlled, the process of detecting an RC protocol may include a process of displaying a virtual input interface of the remote controller corresponding to the type of the device 300 to be controlled for user input on the real image. When the type of the device 300 to be controlled is recognized, for example, when it is recognized that the device 300 to be controlled is a TV, the processor 180 may display a virtual TV remote controller which can control the TV on the real image. Accordingly, the user can transmit a TV control signal to the device 300 to be controlled through buttons of the displayed virtual TV remote controller.

The process of detecting a protocol of the device 300 to be controlled may include one or more sub processes in accordance with a recognition level of the device to be controlled. Further, the sub processes may include a process of verifying the candidate RC protocol in step S140. The process of verifying the candidate RC protocol corresponds to a process of verifying whether an RC protocol selected from the plurality of RC protocols is appropriate to control the device 300 to be controlled. The verifying process is based on recognizing whether the operating status of the device 300 to be controlled which is a subject is changed through the image.

The processor 180 may augment the real image using a UI of an RC protocol-based remote controller in step S150. That is, the remote controller is displayed on the real image and the detected RC protocol is registered in the displayed remote controller so that the processor 180 may complete the augmented reality-based UI which is configured by the real image and the virtual remote controller.

According to an embodiment of the present disclosure, even when the device 300 to be controlled is out of the range of the subject of the terminal 100, it is necessary to independently display the UI of the detected RC protocol-based remote controller from the real image in step S170.

FIG. 8 is an exemplary diagram of S170 in FIG. 7.

Referring to FIG. 8, even though the device 300 to be controlled is out of the range of the subject, the processor 180 may control the device 300 to be controlled using the virtual remote controller which is displayed at all times independently from the real image on the display 151. When the device 300 to be controlled is out of the range of the subject, in order not to interrupt the user to use the terminal 100 for another purpose, the processor 180 may display the remote controller on the display 151 using a UI reduced as compared with the original UI.

Till now, the augmented reality-based device control method S100 according to the embodiment of the present disclosure has been briefly described. Hereinafter, steps of the augmented reality-based device control method will be described in detail.

FIG. 9 is a flowchart of an augmented reality-based device control method according to an embodiment of the present disclosure.

Referring to FIG. 9, steps of a process of recognizing a device 300 to be controlled in the obtained real image have been illustrated.

The terminal 100 may obtain a real image with a device to be controlled as a subject using a camera 121 in step S210. The real image obtained by photographing the device to be controlled corresponds to a background image augmented by a virtual remote controller.

The terminal 100 may recognize the device 300 to be controlled. In order to recognize the device 300 to be controlled, the processor 180 may use various object recognition algorithms such as a method of matching the obtained image and a template, image division and binary large object (BLOB) analysis, a machine learning algorithm, and a deep learning algorithm.

However, a level of recognizing the device 300 to be controlled by the processor 180 may vary depending on quality of the real image in accordance with the environmental influence, the type and the model of the device 300 to be controlled.

For example, the processor 180 may not recognize the object which is the device 300 to be controlled. In this case, the processor 180 may pre-process the obtained real image, for example, corrects a gamma value or a white balance etc., or obtain the real image again using the camera in step S231.

Further, the processor 180 may successfully recognize the object which is the device 300 to be controlled in step S231 but may fail to recognize the type of the device 300 to be controlled.

Further, the processor 180 may successfully recognize whether the device 300 to be controlled corresponds to the TV, an air conditioner, or an audio system, that is, recognize the type of the device 300 to be controlled in step S232 but may fail to recognize the model of the device 300 to be controlled.

Further, the processor 180 may recognize the model of the device 300 to be controlled as well as the type of the device 300 to be controlled in step S234.

According to the embodiment of the present disclosure, the processor 180 may detect a RC protocol which can control the device 300 to be controlled using different methods depending on the recognition level.

When the processor 180 fails to recognize the type of the device 300 to be controlled, the processor 180 displays a manual registration button on the display 151 in step S237 to receive information about the device 300 to be controlled in accordance with the user input.

Further, when the processor 180 successfully recognizes the type of the device 300 to be controlled, but fails to recognize the model, the processor 180 displays buttons of the remote controller corresponding to the type of the device to be controlled in step S233 to proceed to an automatic registration mode to detect the RC protocol in step S238.

When the processor 180 successfully recognizes both the type and the model of the device 300 to be controlled, the processor 180 may detect the RC protocol using the model information. In accordance with hardware information of the device 300 to be controlled whose model name is known, the processor 180 may control the device 300 to be controlled through Internet, for example, a wireless LAN such as Wi-Fi, a short-range communication such as Bluetooth or ZigBee, or a radio frequency such as AM and FM, using the protocol of the corresponding model name in step S236. The Wi-Fi illustrated in FIG. 8 is merely one embodiment and the processor 180 may detect the corresponding protocol of the corresponding model which uses a method other than Infrared communication using the model name. During the detecting process, the terminal 100 may use protocol information stored in the database server 200 through the network 500.

When the device 300 to be controlled is a model which does not support the control through the internet, the short-range communication, or the radio frequency, but supports the control through infrared communication, the processor 180 may set an infrared protocol corresponding to the model in step S239.

FIG. 10 is a flowchart of manual registration of a device to be controlled according to an exemplary embodiment of the present disclosure.

Referring to FIGS. 9 and 10, when none of the model and the type of the device 300 to be controlled is recognized, the processor 180 may display a manual registration button in step S237 and execute the registration mode in accordance with user input using manual buttons in step S310.

The processor 180 may receive information about the type of the device to be controlled in accordance with the user input in step S320. The user may input type information of the device 300 to be controlled, for example, the name of the corresponding type, such as a TV, an audio, or an air conditioner etc., through the UI.

The processor 180 may display a virtual remote controller corresponding to the name of the type of the device 300 to be controlled input by controlling the display 151 in step S330.

The processor 180 may add the input type information of the device 300 to be controlled and the real image obtained using the camera 121 to the RC protocol database in step S340.

Next, the RC protocol detecting process of the processor 180 may be performed in the automatic registration mode and the manual registration button is deleted in step S350. Accordingly, the manual registration process of the type name of the device 300 to be controlled which is not recognized and the real image ends.

A signal transmitting method of the remote controller which controls the device 300 to be controlled includes infrared communication, short-range communication, radio frequency communication, and Internet communication methods. The infrared communication method uses an infrared ray or near infrared ray which is one of electromagnetic waves existing between the visible ray and the radio wave. The short-range communication method may include Zig-Bee or Bluetooth. The radio frequency method includes an AM or FM method and also includes RFID and IRDR. The internet communication method may include wireless LAN, for example, a code transmission method through Wi-Fi.

The remote control of the device 300 to be controlled may be performed by transmitting or receiving signals between a transmitter and a receiver. The terminal 100 includes a transmitter corresponding to the RC protocol and the device 300 to be controlled may include a receiver which recognizes the RC code transmitted by the transmitter. A circuit which configures an IR transmitter may be configured to include a transistor, an IR-LED, and a resistor. A circuit which configures the IR receiver may be configured to include a photo diode, a band pass filter (BPS), and a pre-amplifier.

Next, an RC protocol detecting process by automatic registration which starts when a user presses a button of the virtual remote controller will be described.

FIG. 11 is a flowchart of automatic registration of a device to be controlled according to an exemplary embodiment of the present disclosure.

Referring to FIG. 11, it is determined whether to enter an automatic registration mode to detect the RC protocol in accordance with the recognition level of the device 300 to be controlled which has been described in FIG. 11 in step S423.

When the processor successfully recognizes the type and the model of the device 300 to be controlled and the device 300 to be controlled supports communication other than the infrared communication, the processor 180 may transmit a corresponding code of a protocol of the internet or the short-range communication to the device 300 to be controlled in step S412. For example, the processor 180 may transmit a code of the protocol for controlling the device 300 to be controlled to the receiver of the device 300 to be controlled using a wireless LAN, for example, Wi-Fi.

When the processor successfully recognizes the type and the model of the device 300 to be controlled but the device 300 to be controlled does not support communication other than the infrared communication, the processor 180 may search for the corresponding code of the infrared (IR) protocol set in the corresponding model in step S431, and transmit the corresponding code to the device 300 to be controlled through the IR transmitter in step S432.

When the type of the device 300 to be controlled is successfully recognized, but the model recognition fails, the processor 180 may search for an IR protocol which is compatible with the original protocol of the device 300 to be controlled in an automatic registration mode in step S441.

Further, whether to enter the automatic registration mode may be determined depending on whether the button of the virtual remote controller is pressed by the user for a long time. When the user recognizes that the device 300 to be controlled does not operate after pressing the virtual remote controller for a short time and then presses the buttons for a long time, the processor 180 may successfully recognize the type of the device 300 but fail to recognize the model. The processor 180 may determine that the button presses for a long time in step S421 and search for a compatible protocol suitable for the device 300 to be controlled in the automatic registration mode in step S441.

The detecting of a compatible protocol suitable for the device 300 to be controlled may be configured to include searching for a compatible protocol in step S411, searching for codes in step S442, transmitting a code in step S443, verifying a protocol in steps S451 and S452, and registering the real image and the detected protocol in step S460.

The processor 180 may search for a protocol compatible with the original RC protocol of the device 300 to be controlled using the protocol database in step S441. The protocol database may be provided by the server 200. The protocol database may include infrared protocol information which is currently used around the world. As an IR protocol format for controlling the device 300 to be controlled, NEC or TOSHIBA protocol format is mainly used in Korea. In Europe, RC-5 or RC-6 format is mainly used and an IR protocol format which is used around the world may include MITSUBISHI format, PANASONIC format, RCA format, and the like.

The processor 180 may detect an RC protocol suitable to control the device 300 to be controlled by detecting the RC code corresponding to a button pressed by undergoing trial and error method based on the secured protocol database.

The processor 180 sequentially transmits RC codes corresponding to buttons of the virtual remote controller pressed by the user in the searched protocol and recognizes the change in the image of the device to be controlled which receives the RC codes to detect an RC protocol suitable for the device 300 to be controlled. Further, the processor 180 recognizes an operation sound generated in the device 300 to be controlled separately from the image change of the device to be controlled or together therewith to determine whether the device 300 to be controlled operates by receiving the RC code. The processor 180 may recognize whether the operation sound is generated using the microphone 122 of the terminal 100. The detection of the RC code which can operate the device 300 to be controlled corresponding to the button pressed by the user may be sequentially performed by the processor 180 with respect to the secured candidate protocols.

When the image change or the generation of the operation sound of the device 300 to be controlled which receives the RC code is recognized, the processor 180 may add the obtained real image and the detected protocol to the database in step S460. The database to which the real image and the protocol are added is stored in the terminal 100 and the automatic registration mode ends in step S470.

As described above, according to the present disclosure, a device to be controlled may be remotely controlled based on augmented reality using a remote control protocol which is detected by various methods depending on an image recognition accuracy.

Further, the device to be controlled may be remotely controlled without depending on server relay between a control device and a remote controller.

Further, in a state in which control device information is not secured in advance, a remote controller protocol may be detected by means of image recognition.

Embodiments according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

The singular forms "a," "an" and "the" in this present disclosure, in particular, claims, may be intended to include the plural forms as well. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method, comprising:
   obtaining a real image, by a camera, of a device to be controlled, wherein the real image is to be used to configure an augmented reality (AR)-based remote controller;
   performing a recognition of the device from the real image, for detecting device information of the device, wherein the device information is used to detect a remote control (RC) protocol of the device;
   detecting the remote control (RC) protocol of the device based on the recognition of the device, wherein the detecting of the RC protocol includes verifying whether the device is controllable through a candidate RC protocol by controlling the device in accordance with the real image;
   augmenting the real image with a first user interface (UI) of the AR-based remote controller which controls the device based on the RC protocol; and
   based on a determination that the device is out of a field of view of the camera and a determination that another application not related to the device to be controlled is being executed, displaying a reduced second user interface (UI) of the AR-based remote controller along with a screen of the another application being executed, wherein the reduced second UI of the AR-based remote controller is reduced in size compared to the first UI,
   wherein performing the recognition of the device further includes:
      receiving a type information of the device in accordance with a user input when the type of the device and a model name of the device are not recognized based on the real image;
      displaying the first UI with the real image; and
      adding the real image and the type information to a database.

2. The method of claim 1, wherein the real image includes at least one of a monitor or a light indicator which displays an operation status of the device.

3. The method of claim 1, wherein performing the recognition of the device further includes recognizing at least one of a type or a model name of the device.

4. The method of claim 1, wherein performing the recognition of the device further includes:
   receiving a user input via the AR-based remote controller when a type of the device is recognized;
   detecting one or more candidate protocols including at least one of: the RC protocol of the device or a compatible protocol compatible with the RC protocol; and
   detecting the RC protocol of the device from among the one or more candidate protocols by detecting an RC code corresponding to an instruction from a user.

5. The method of claim 1, wherein verifying whether the device is controllable further includes determining whether the device is controllable using at least one of image recognition or sound recognition.

6. The method of claim 1, wherein verifying whether the device is controllable further includes:
   transmitting an RC code of the candidate RC protocol in accordance with a user input received via the first UI;
   recognizing a reaction from the device by receiving the RC code based on whether the device operates according to the received user input; and
   detecting the candidate RC protocol as the RC protocol of the device when the device operates according to the received user input.

7. An apparatus comprising:
   a display;
   a camera configured to obtain a real image of a device to be controlled, wherein the real image is to be used to configure an augmented reality (AR)-based remote controller; and a processor configured to:
perform a recognition of the device from the real image, for detecting device information of the device, wherein the device information is used to detect a remote control (RC) protocol of the device;
detect the remote control (RC) protocol of the device based on the recognition of the device, wherein the detection of the RC protocol includes verifying whether the device is controllable through a candidate RC protocol by controlling the device in accordance with the real image,
augment the real image with a first user interface (UI) of the AR-based remote controller which controls the device based on the RC protocol, and
based on a determination that the device is out of a field of view of the camera and a determination that another application not related to the device to be controlled is being executed, display a reduced second user interface (UI) of the AR-based remote controller along with a screen of the another application being executed, wherein the reduced second UI of the AR-based remote controller is reduced in size compared to the first UI, and
wherein performing the recognition of the device further includes:
receiving a type information of the device in accordance with the user input when the type and of the device and a model name of the device are not recognized based on the real image;
control the display to display the first UI with the real image; and
add the real image and the type information to a database.

8. The apparatus according to claim 7, wherein the real image includes at least one of a monitor or a light indicator which displays an operation status of the device.

9. The apparatus according to claim 7, wherein the display is further configured to include an input device which receives user input via the AR-based remote controller; wherein the processor is further configured to:
control the display to receive the user input via the AR-based remote controller when a type of the device is recognized,
detect one or more candidate protocols including at least one of: the RC protocol of the device or a compatible protocol compatible with the RC protocol, and
detect the RC protocol of the device from among the one or more candidate protocols by detecting an RC code corresponding to an instruction from a user.

10. The apparatus according to claim 7, further comprising a microphone configured to receive sound, wherein the processor is further configured to control at least one of the camera or the microphone to determine whether the device is controllable using at least one of image recognition or sound recognition.

11. The apparatus according to claim 7, wherein the display is further configured to display the first UI with the real image, wherein the first UI corresponds to a type of the device; and
a transmitter configured to transmit an RC code of the candidate RC protocol, wherein the processor is further configured to:
control the transmitter to transmit the RC code of the candidate RC protocol in accordance with a user input received via the first UI,
control the display to recognize a reaction from the device by receiving the RC code based on whether the device operates according to the received user input; and
detect the candidate RC protocol as the RC protocol of the device when the device operates according to the received user input.

* * * * *